United States Patent [19]

Field et al.

[11] Patent Number: 4,788,480
[45] Date of Patent: Nov. 29, 1988

[54] VOLTAGE CONTROL FOR BATTERY POWERED MOTOR OR THE LIKE

[75] Inventors: Bruce F. Field, Minneapolis; Richard A. Mason, Buffalo, both of Minn.; Steven J. A. Waldhauser, Niagara Falls, N.Y.

[73] Assignee: Tennant Company, Minneapolis, Minn.

[21] Appl. No.: 82,665

[22] Filed: Aug. 7, 1987

[51] Int. Cl.$^4$ .............................................. H02P 7/14
[52] U.S. Cl. ..................................... 318/442; 307/43; 307/54; 307/85; 318/139
[58] Field of Search ............... 318/106, 107, 108, 109, 318/139, 150, 151, 161, 440, 442, 123, 124, 126, 127, 128, 134, 162, 163, 164; 307/18, 23, 29, 43, 66, 80, 48, 52, 54, 46, 85, 86; 320/8

[56] References Cited

U.S. PATENT DOCUMENTS

| | | | |
|---|---|---|---|
| 3,045,624 | 7/1962 | Daly et al. | 318/139 X |
| 3,659,114 | 4/1972 | Polenz et al. | 307/85 X |
| 3,845,835 | 11/1974 | Petit | 320/8 X |
| 3,917,017 | 11/1975 | Deane | 320/8 X |
| 3,987,308 | 10/1976 | Burch | 307/52 X |
| 4,017,779 | 4/1977 | McDonald et al. | 307/86 X |
| 4,055,789 | 10/1977 | Lasater | 318/138 X |
| 4,297,590 | 10/1981 | Vail | 307/48 X |
| 4,348,628 | 9/1982 | Loucks | 318/139 X |
| 4,413,220 | 11/1983 | Waineo | 307/18 X |
| 4,580,081 | 4/1986 | Krueger et al. | 318/442 X |
| 4,689,531 | 8/1987 | Bacon | 318/139 |

Primary Examiner—Bentsu Ro
Attorney, Agent, or Firm—Kinzer, Plyer, Dorn, McEachran & Jambor

[57] ABSTRACT

A method of control and a control circuit for use in connecting all or sub-parts of a battery supply to a battery driven motor includes relays connected between a motor and each sub-part of a battery supply; a timer having a predetermined time period and which changes its output condition at the end of each time period; a motor speed selector for selecting either full motor speed or a portion thereof; and a switch arrangement which interconnects the relays, timer and motor speed selector. The switch arrangement provides for a first sub-part of the battery supply to be connected to the motor when the selector is in a less than full speed position and when the timer has one output condition. A second sub-part of the battery supply is connected to the motor when the selector is in a less than full speed position and the timer has a second output condition. The relays connect the full battery supply to the motor when the selector is in a full speed position.

8 Claims, 1 Drawing Sheet

VOLTAGE CONTROL FOR BATTERY POWERED MOTOR OR THE LIKE

SUMMARY OF THE INVENTION

The present invention relates to a voltage control for battery powered motors and in particular to such a control which provides for equal use of sub-parts of a battery supply.

The present invention has application in surface maintenance machines such as scrubbers and sweepers, but is equally applicable to a wide variety of machines or devices which utilize battery driven motors. The invention is particularly concerned with battery driven motors in which at times the motor is driven at less than full speed by supplying it with voltage from only a sub-part of a battery supply, and provides a means whereby unequal battery drainage is avoided when the motor is operated at less than full battery supply voltage.

One purpose of the present invention is a method of controlling application of battery power to a battery driven motor which insures that when sub-parts of the battery are used, they will be equally used.

Another purpose is a voltage control circuit for battery powered motors which utilizes a timer with a memory to insure that sub-parts of the battery have equal use and that the equal use takes place even if use of the motor is discontinuous.

Another purpose is a simply constructed reliably operable voltage control circuit for battery driven motors which insures that all sub-parts of the battery are equally used when the motor is driven at less than full speed.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention will be described as applied to a surface maintenance machine such as a scrubber or sweeper, but is equally applicable to other types of battery driven machines and vehicles, for example, golf carts. In a machine which uses battery power for propulsion, when the machine is run at full speed, all of the battery supply is used. However, when the machine is run at less than full speed, for example half speed or some other intermediate speed, only portions of the battery supply are used. The present invention provides a means for equalizing the draining or use of the various sub-parts of the battery supply. Whenever the motor is operated at less than full speed, a timer records the length of such use and once a predetermined time period has been reached, the motor will automatically be switched to another portion of the battery supply. Use of a particular sub-part of the battery supply will continue until the predetermined time period is reached even if such use is discontinuous. Thus, if a machine is operated at less than full speed for a portion of the allotted time period and then either shut down or switched to high speed, when the machine is again returned to a low speed it will again use the same sub-part of the battery until the remaining portion of the allocated time is used up, after which the control described herein will automatically switch the motor to another sub-part of the battery supply. Thus all subparts will be used equally over a period of time.

Figure 1:
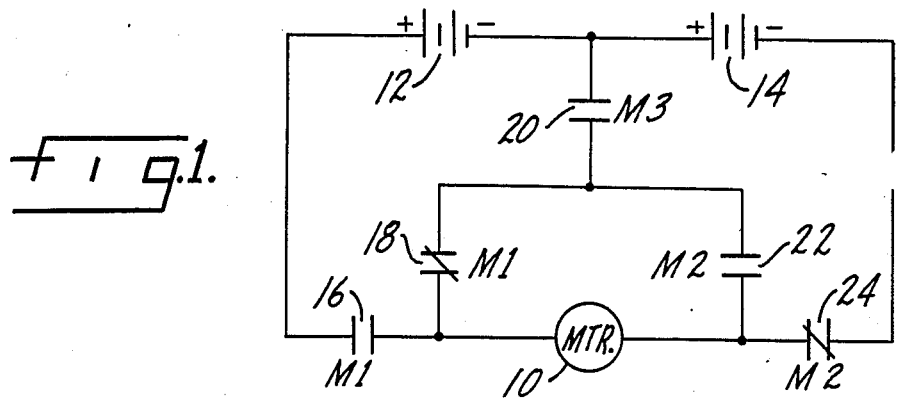
FIG. 1 is a schematic diagram of a motor and battery circuit illustrating relay contacts which are used to control the application of battery power to the motor.

In FIG. 1 a DC motor is indicated at 10 and batteries 12 and 14 supply the power thereto. The batteries, in combination, constitute the battery supply and although only two subparts of the battery supply are disclosed herein, it is clear that the principles can be applied to multiple sub-parts so that there can be as many variations of reduced speed for the motor as are desired.

The circuit uses three relays which are designated M1, M2 and M3. The relays have both normally open contacts and normally closed contacts, with the relays being shown in FIG. 1 in their unactivated position or the position in which no power is supplied to the relay coils. Relay M1 has a first pair of contacts 16 which are normally open and which connect the positive side of battery 12 to motor 10. Relay M1 further has a normally closed set of contacts 18 which connect the same side of motor 10, through normally open contacts 20 of relay M3 to the positive side of battery 14 and the negative side of battery 12. Contacts 22 of relay M2, which are normally open, connect the opposite side of motor 10 to the bottom of normally open contacts 20 and normally closed contacts 24 connect the second side of motor 10 to the negative side of battery 14.

Figure 2:
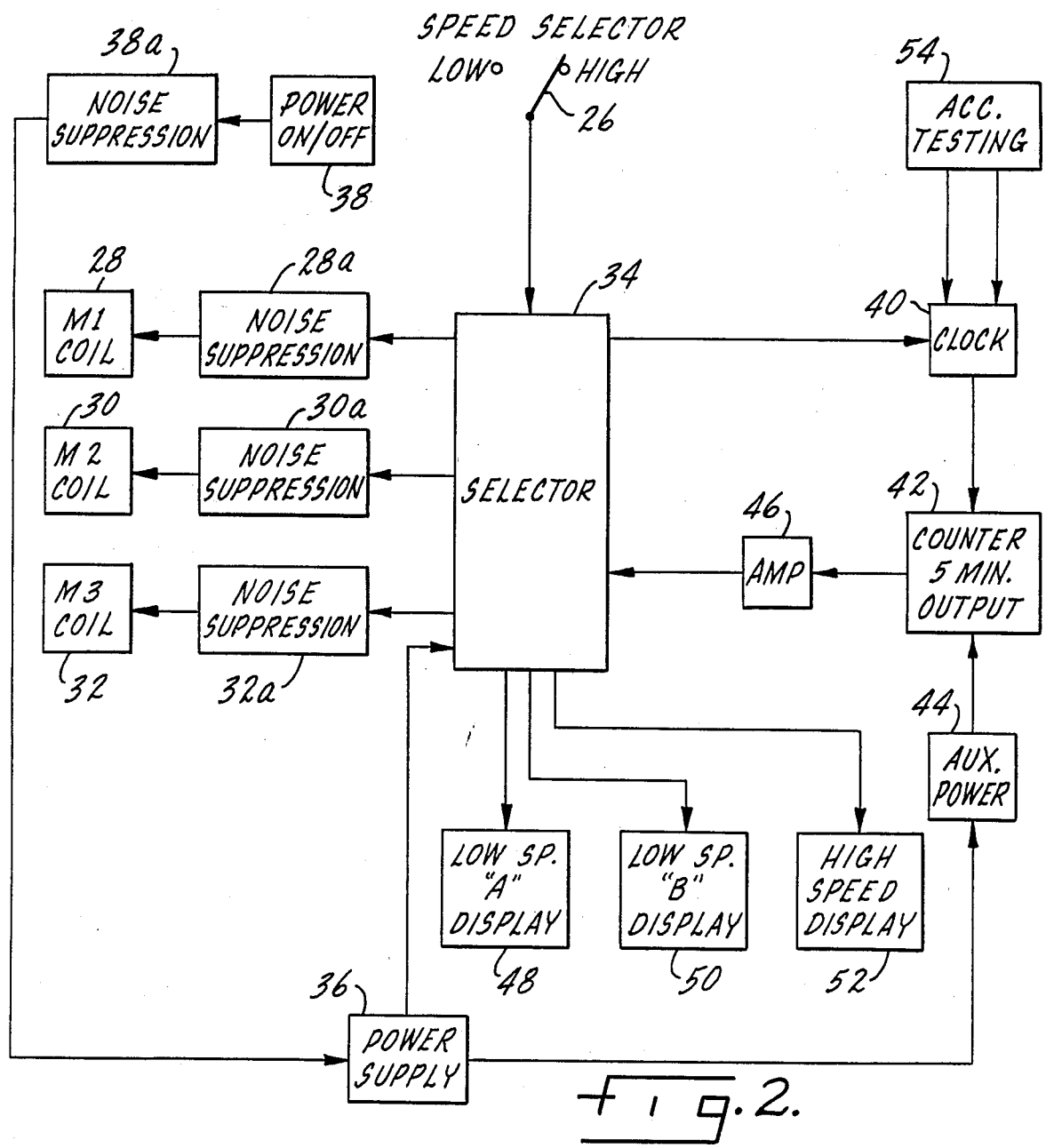
FIG. 2 is a block diagram of the control circuit regulating operation of the relays in the schematic diagram of FIG. 1.

As described herein, the motor has two speeds, a high speed and a low speed. When the speed selector switch 26 shown in FIG. 2 is in the high speed position, relay M1 will be activated and relays M2 and M3 will not be activated. Accordingly, contacts 16 and 24 will be closed and contacts 18, 20 and 22 will be open, so there will be a complete circuit between motor 10 and batteries 12 and 14 and full battery power will be applied to the motor.

There are two low speed battery supply conditions, each of which uses one of the two sub-parts 12 or 14 of the battery supply. When speed selector 26 is in the low speed position, and assuming condition A prevails, which will be described in more detail hereinafter, relays M1, M2 and M3 are all activated. Contacts 16 are closed as are contacts 20 and 22. Contacts 18 and 24 are open, thus battery 12 supplies its power to motor 10. In low speed condition B, relays M1 and M2 are deactivated and relay M3 is activated. Contacts 20 are closed, as are contacts 18 and 24, so that battery 14 supplies its power to motor 10 and battery 12 does not.

In the block diagram of FIG. 2, the coils for relays M1, M2 and M3 are indicated at 28, 30 and 32, respectively, and are each connected through noise suppression circuits 28a, 30a and 32a to a logic circuit 34 designated as a selector. Speed selector switch 26 is connected to selector 34, as is power supply 36 which is controlled by a power ON/OFF switch 38 through a noise suppression circuit 38a. The selector 34 will apply power from power supply 36 selectively to the relay coils 28, 30 and 32.

A clock circuit is indicated at 40 and may, for example, be a free-running multivibrator which is triggered by a signal from selector 34 whenever speed selector switch 26 is in the low speed position. Clock 40 provides a continuous train of clock pulses to a counter 42 which may, for example, be a five minute counter which has the result of changing the condition of the output of the counter every five minutes or after a count has been accumulated which is equal to a five minute period of time. Counter 42 includes a memory, as the memory is used to accumulate the count and the count will remain active in the memory even though the machine is shut down, as there is an auxiliary power supply 44, connected to power supply 36, which is effective to maintain counter 42 and thus its memory in a power ON condition at all times.

The output of counter 42 is connected through an amplifier 46 to selector 34. The outputs from the selector, in addition to the relay coils described, include various displays for use by the machine operator. There is a low speed "A" display 48, a low speed "B" display 50 and a high speed display 52, each of which is effective to tell the operator whether the battery control circuit is utilizing one side of the battery or the other or both sides, as in a full speed operation.

The diagram of FIG. 2 is completed by an accelerated testing circuit 54 which is connected to clock 40 and when activated by the operator is effective to accelerate or increase the speed of the clock or the frequency of its oscillator so that the control may quickly cycle through the two states of the counter to enable the operator to determine if the control circuit is functional. Again, the invention should not be limited to a battery supply with only two sub-parts, as the concepts of the invention are equally applicable to a battery supply with multiple sub-parts which, through appropriate relays, may be applied individually to a battery powered motor or in combinations of less than all or all to the motor to derive multiple speeds therefor.

In operation, when the speed selector switch 26 is on high speed, clock 40 is not activated and logic selector 34 will power up only relay M1 with the result that the entire battery supply will be applied to the motor, as described. When the speed selector switch 26 is switched to low speed, clock 40 will be activated and initially relays M1, M2 and M3 will all be powered by selector 34 and the control will be in low speed condition A, with the motor powered by battery 12. Pulses from clock 40 will be accumulated in counter 42 and assuming the machine stays in a low speed condition, when there is five minutes of operation, counter 42 will have reached a predetermined accumulated count and the condition of its output will change, for example from high to low. This signal, amplified by amplifier 46, will be applied to selector 34 with the result that relays M1 and M2 will be deactivated and relay M3 will remain in an activated condition. This will change the motor from battery 12 t battery 14. The control will then be in low speed condition B. The counter will continue accumulating counts until the five minute time period, which is only by way of example, is reached, after which logic selector 34, upon a change in the output condition of counter 42, will change the operation of the relays so that all three relay coils will be activated and the machine will be in low speed condition A. In each case the displays 48, 50 and 52 will appropriately indicate which operating condition is present.

Because counter 42 and its included memory is always powered up, if the machine is shut down during a period of low speed operation, when the machine is again started, and assuming it is again in a low speed condition, since counter 42 will not have reached its predetermined count, the condition of selector 34 will remain unchanged and the relays will remain in the same operating condition they were in prior to shutdown. Thus, the time during which either of the battery supply sub-parts is used will be equalized, even if the period of low speed operation is discontinuous. The same sequence of operation will apply if before counter 42 has timed out the machine is switched from low speed to high speed operation. The count in the memory will remain and when the machine is subsequently switched back to low speed operation the count will again continue as the clock 40 will be triggered when speed selector switch 26 is moved to a low speed condition. The time of use of the two sub-parts of the battery are equalized, even if the time periods of use are discontinuous, caused by either a switching to high speed operation or a machine shutdown.

Whereas the preferred form of the invention has been shown and described herein, it should be realized that there may be many modifications, substitutions and alterations thereto.

The embodiments of the invention in which an exclusive property or privilege is claimed are defined as follows:

1. A control circuit for use in connecting all or sub-parts of a battery supply to a battery driven motor, including:
   relay means connected between a motor and each sub-part of a battery supply,
   timing means having a predetermined time period and which changes its output condition at the end of each timing period,
   a motor speed selector for selecting full motor speed or a portion thereof,
   switch means interconnecting said relay means, timing means and motor speed selector whereby:
     said relay means are operable in a first position to connect a first sub-part of the battery supply to the motor when said selector is in a less than full speed position and with said timing means having a first output condition;
     said relay means are operable in a second position to connect a second sub-part of the battery supply to the motor when said selector is in a less than full speed position and with said timing means having a second output condition;
     said relay means are operable in a third position to connect the full battery supply to the motor when said selector is in a full speed position.

2. The control circuit of claim 1 wherein said timing means includes a counter and a memory, with termination of a timing period occurring when said memory has accumulated a predetermined count as determined by said counter.

3. The control circuit of claim 2 further including a power supply for said memory to maintain the memory in a particular condition, even if the motor is not being driven by the battery supply.

4. The control circuit of claim 1 wherein said battery supply has two sub-parts, said motor speed selector having a full speed position and a half speed position, and said timing means having two output conditions.

5. A control circuit for use in connecting all or either half of a battery supply to a battery driven motor, including:

relay means connected between a motor and each half of a battery supply, a timer with two output conditions, including a counter, memory and power supply, with the output of the timer changing from one output condition to the other at the end of each time period determined by a predetermined accumulated count in the memory, a motor speed selector for selecting high speed or low speed, switch means interconnecting said relay means, timer and motor speed selector whereby:

said relay means are operable in a first position to connect one half of the battery supply to the motor when the selector is in a low speed position and with said timer having said one output condition;

said relay means are operable in a second position to connect the other half of the battery supply to the motor when the selector is in a low speed position and with the timer having the other of its two output conditions;

said relay means are operable in a third position to connect the full battery supply to the motor when said selector is in a full speed position.

6. The control circuit of claim 5 wherein a timer power supply is continuously connected to said memory.

7. A method of controlling the supply of all or sub-parts of a battery voltage to a battery driven motor including the steps of:

connecting the full battery voltage to the battery driven motor when full speed is selected for the motor, connecting a first sub-part of battery voltage to the motor when less than full speed is selected, timing the period of battery voltage first sub-part use when less than full speed is selected and maintaining use of the first battery sub-part for a predetermined period of time, which time period is continuous if selection of less than full motor speed is continuous and which time period is discontinuous if selection of less than full motor speed is discontinuous.

8. The method of claim 7 further including the step of connecting a second sub-part of battery voltage to the motor when less than full speed is selected and when the predetermined period of time for use of the first battery sub-part has expired, timing the period of battery voltage second sub-part use when less than full speed is selected and maintaining use of the second battery sub-part for a predetermined period of time, which period is either continuous or discontinuous, depending upon whether selection of less than full speed is continuous or discontinuous.

* * * * *